(12) United States Patent
Cursio (10) Patent No.: US 10,779,911 B2
(45) Date of Patent: Sep. 22, 2020

(54) ORTHODONTIC SYSTEM WITH AN ARCHWIRE COUPLABLE TO AN ELEMENT

(71) Applicant: Luigi Cursio, Turin (IT)

(72) Inventor: Luigi Cursio, Turin (IT)

( * ) Notice: Subject to any disclaimer, the term of this patent is extended or adjusted under 35 U.S.C. 154(b) by 0 days.

(21) Appl. No.: 15/775,268

(22) PCT Filed: Nov. 10, 2016

(86) PCT No.: PCT/IB2016/056774
§ 371 (c)(1),
(2) Date: May 10, 2018

(87) PCT Pub. No.: WO2017/081637
PCT Pub. Date: May 18, 2017

(65) Prior Publication Data
US 2018/0325629 A1    Nov. 15, 2018

(30) Foreign Application Priority Data

Nov. 10, 2015  (IT) .......................... 102015000070877

(51) Int. Cl.
*A61C 7/30* (2006.01)
*A61C 7/20* (2006.01)
*A61C 7/14* (2006.01)
*A61C 7/12* (2006.01)
*A61C 7/16* (2006.01)

(52) U.S. Cl.
CPC ............... *A61C 7/30* (2013.01); *A61C 7/12* (2013.01); *A61C 7/14* (2013.01); *A61C 7/16* (2013.01); *A61C 7/20* (2013.01)

(58) Field of Classification Search
CPC .... A61C 7/12; A61C 7/14; A61C 7/20; A61C 7/28
See application file for complete search history.

(56) References Cited

U.S. PATENT DOCUMENTS 2,926,422 A * 3/1960 Wallshein ............... A61C 7/12
433/8
3,043,007 A * 7/1962 Wallshein ............... A61C 7/12
433/8

(Continued)

FOREIGN PATENT DOCUMENTS

WO    03/045266 A1    6/2003
WO    03/082138 A1    10/2003

OTHER PUBLICATIONS

International Search Report (ISR) and Written Opinion (WO) dated Feb. 13, 2017 for International Application No. PCT/IB2016/056774.

*Primary Examiner* — Ralph A Lewis
(74) *Attorney, Agent, or Firm* — Ladas & Parry LLP (57) ABSTRACT

An element intended for an orthodontic system comprises: a fixing surface to be attached to the wall of a tooth; a body, having sides counterposed with respect to the fixing surface and defining a groove passing through sides, for housing an arch wire that can be removed and protrudes while being kept in the groove through at least one of sides with respect of the element; a slit passing through the sides toward the groove in order to assemble the archwire in the groove. In this way the play between the arch wire and the hole is lower than the space between the archwire and the groove, in order to keep the archwire in the body.

7 Claims, 12 Drawing Sheets

(56) References Cited

U.S. PATENT DOCUMENTS

| | | | | |
|---|---|---|---|---|
| 4,799,883 A | * | 1/1989 | Stoller | A61C 7/12 433/11 |
| 5,356,288 A | * | 10/1994 | Cohen | A61C 7/14 433/10 |
| 5,474,447 A | * | 12/1995 | Chikami | A61C 7/12 433/10 |
| 7,175,428 B2 | * | 2/2007 | Nicholson | A61C 7/28 433/10 |
| 7,306,457 B2 | * | 12/2007 | Vigolo | A61C 7/14 433/10 |
| 7,387,512 B2 | * | 6/2008 | Clor | A61C 7/02 433/10 |
| 7,677,887 B2 | * | 3/2010 | Nicholson | A61C 7/28 433/11 |
| 8,485,816 B2 | * | 7/2013 | MacChi | A61C 7/14 433/10 |
| 10,470,849 B2 | * | 11/2019 | Braun | A61C 7/28 |
| 2003/0118967 A1 | | 6/2003 | Tepper | |
| 2013/0252194 A1 | | 9/2013 | Hagelganz et al. | |

\* cited by examiner

ORTHODONTIC SYSTEM WITH AN ARCHWIRE COUPLABLE TO AN ELEMENT

RELATED APPLICATION

This application is a national phase entry under 35 USC 371 of international Patent Application No.: PCT/IB2016/056774 filed on 10 Nov. 2016, which claims priority from Italian Patent Application No. 102015000070877 filed on 10 Nov. 2015, the disclosures of which are incorporated herein by reference in their entirety.

TECHNICAL FIELD

The present invention is about an orthodontic element to be fixed to a tooth for an archwire orthodontic system intended to correct teeth's position.

An archwire orthodontic system comprises a plurality of elements through which passes an archwire for correcting and modifying teeth's position. Each element is fixed to a specific tooth. The correcting process is carried out by the wire thanks to forces and moments applied to the elements. These forces are generated by elastic deformations or by recovery of the initial state shape, as the case when the archwire is made of a shape memory material that can be activated by surpassing a specific temperature.

It is possible to apply an archwire in order to couple the elements fixed to the superior or inferior dental arch. It is instead necessary to apply two archwires when correcting both superior and inferior defects.

The wire has to be removable, so that archwires with different mechanic characteristics may be used. This feature is necessary to apply the ideal force to every element for a sufficient period to permanently correct the position. Different characteristics of the wire may depend on the material, the shape and the dimensions of the wire. Recent studies about the migration of teeth are crucial to comprehend teeth's biomechanics. These studies have been carried out by Freiburg and Ulm Universities in Germany, by using particular orthodontic devices. It has surprisingly been shown that weak forces move more efficiently the teeth: that's the case of the present invention, by applying a maximum of 8 N/cm linear pressure (a maximum of 3 N/cm on the incisors).

BACKGROUND ART

It is known to provide orthodontic elements with a rigid and movable closure, usually a sliding or hinged closure intended to clamp the archwire in use and permit the replacement with the new ones when necessary.

Nevertheless, these types of closure usually involve relatively bulky elements and the possibility that food leftovers and crusts block closure's movements, which may be damaged when the wire is replaced.

Furthermore, when replacing the wire it is necessary to open and close the closure of each element, which requires ability and time. It makes the entire operation uncomfortable for who performs the replacement and who undergoes the treatment.

The closures are fragile and tend to get damaged, requiring replacement operations that undermine the efficacy of the treatment.

The document U.S. Pat. No. 5,474,447 describes an element having a slit and an elastic archwire with wings. The archwire can be assembled on the elements only when the fins have previously been manually pinched. Consequently the elastic archwire's assembling operation is quite inconvenient. In addition, the archwire's transverse section has to be conveniently designed in order to be pinched.

DISCLOSURE OF INVENTION

The scope of the present invention is to provide an element whose assembling and disassembling operation is simplified, staking the element less vulnerable to damages.

A further scope is to provide an element with a peculiar arrangement against crusts and food's leftovers.

A further scope is to provide an element with a compact shape in order to simplify the manufacturing operations of smoothing corners, sides and protuberances so as to enhance user's comfort once the system is mounted on the teeth.

A further scope is to minimize the duration of the treatment in order to reduce the aphtae, plaques and caries impact.

The scope of this invention can be achieved by an orthodontic kit according to claim 1.

BRIEF DESCRIPTION OF THE DRAWINGS

The invention will be described with respect to non-scaled drawings showing non-limiting embodiments and referring to:

FIGS. 2 and 3 show a perspective schematic view of an orthodontic element which when viewed in conjunction may assist in understanding the present invention.

FIGS. 4a-l and 5-11 show perspective views of other orthodontic elements

BEST MODE FOR CARRYING OUT THE INVENTION

Figure 1A:
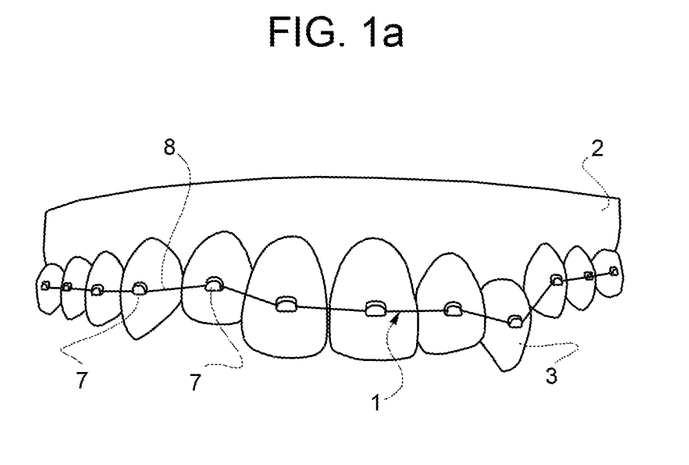
FIG. 1a, b, c: relative sketches of am archwire orthodontic system each showing a specific tooth's position that needs to be corrected.

In FIG. 1a numeral 1 refers to an archwire orthodontic system on a superior dental arch 2. Tooth 3 from the superior arch 2 presents an extrusion defect.

Figure 1B:
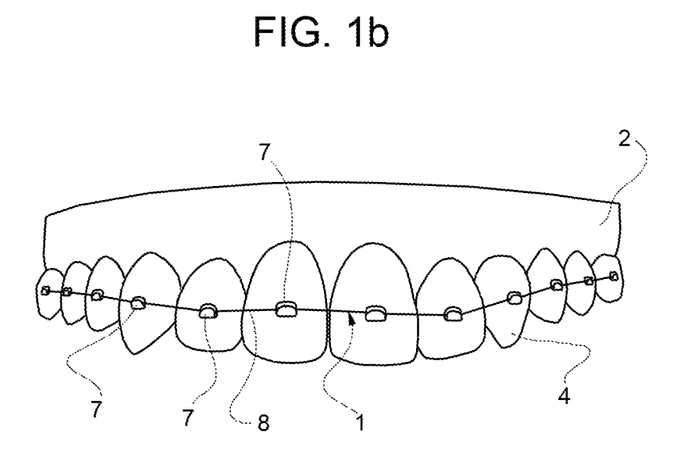

FIG. 1b shows orthodontic system 1 applied to a superior dental arch 2, with tooth 4 having a tip defect, with excessive distal direction.

Figure 1C:
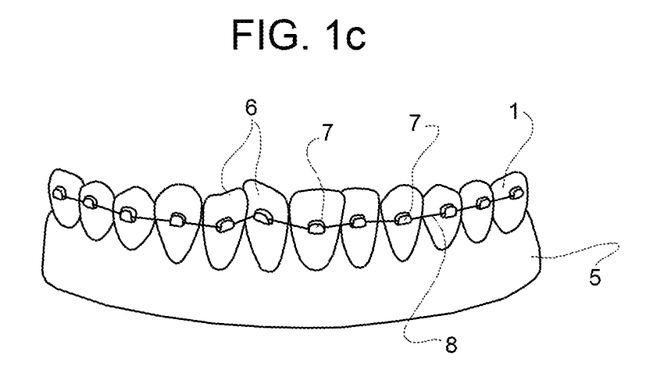

FIG. 1c shows: orthodontic system 1 applied to an inferior dental arch 5 with a teeth couple 6 having an overcrowding and rotation defect, excessive around its longitudinal axis.

A tooth can also have a torque defect in vestibular or lingual direction (not depicted).

Using an arch wire system it is also possible to correct an "in-out" defect, which is a misalignment along the dental arch's axis.

Orthodontic kit 1 comprises a plurality of elements 7, each of which is fixed to a relative tooth, and an archwire 8, coupled to each element 7 on the same dental arch 2 or 5, so that the elements 7 define specific constraints to the archwire 8. According to the example shown, the archwire is curved and assembled on the elements 7, with play in the direction of its own axis (FIG. 1a, 10). In this way the archwire is not significantly stressed by traction forces.

Various defects can be corrected through the application of forces on the elements 7 by the archwire 8, generated by bending forces produced by the constraints set on the archwire 8. Such defects are: extrusion/intrusion defects, misalignment along dental arch's axis, medial/distal inclination, excessive rotation defects.

Vestibular/lingual inclination defects can be corrected through torsion forces applied on the elements 7 by the archwire 8.

Figure 2:
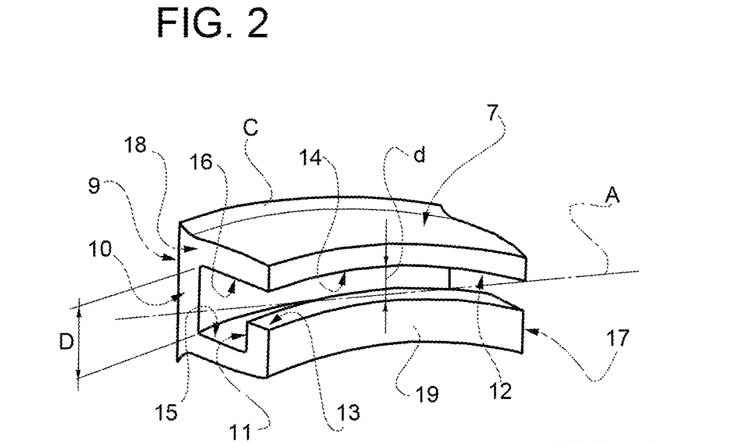

FIG. 2 shows a first embodiment of element 7 according to the present invention.

Element 7 has a fixing surface 9 to be rigidly connected to the relative tooth through an adhesive and an elongated body 10, which defines a housing groove 11 to house an archwire 8's section. The element 7 also has a slit 12 entering in groove 11 to assemble and disassemble the archwire 8 with a transversal movement, preferably a perpendicular movement, to an axis A of groove 11. The groove 11 can be slightly curved and in that case axis A is the axis of the theoretical cylinder that has the maximum diameter to be contained in the groove 11.

The slit 12 is delimited by a first and a second edge 13, 14, lower, and upper respectively with respect to FIG. 2. The edges have a minimum distance "d" inferior to a distance "D" between two faces 15, 16 defining groove 11. In this way the archwire 8's assembly play within slit 12 is inferior to the play within groove 11. Thus the wire 8 is kept in the groove 11 to apply to the element 7 the necessary forces to correct the teeth's position defects.

Furthermore, element 7 defines respective sides 17, 18 opposed with respect to the fixing surface 9 and oriented in use in mesial—distal direction. Both groove 11 and slit 12 pass through sides 17, 18, so that archwire 8 projects out of one or each side 18 to couple to one or two elements 7.

Figure 3A:
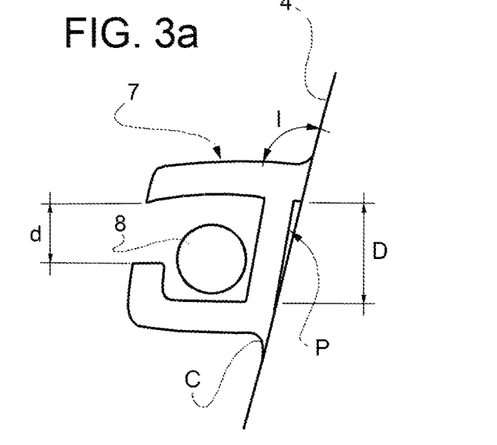
FIG. 3a, b, c: transverse sections of the element in FIG. 2 paired to a circular sectioned wire; paired to a polygonal sectioned wire; with a perspective view with partly removed portions, respectively.
Figure 3B:
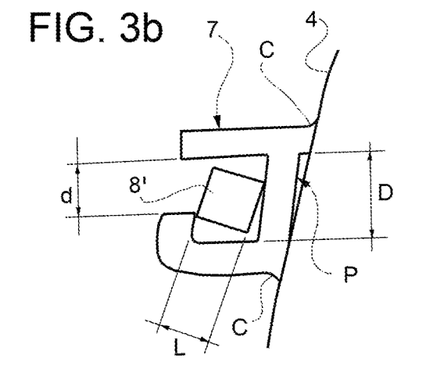
Figure 3C:
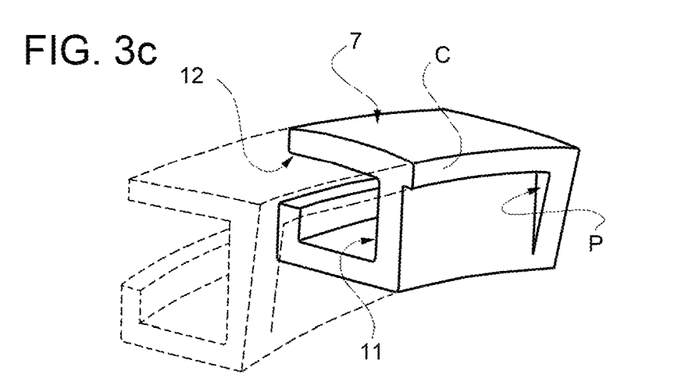

The FIGS. 3a, 3b snow relative cross sections coupled to an archwire 8 having a circular section and to an archwire 8' having a squared, rectangular or elliptical section having a shape factor equal or lower than 2, i.e. the ratio between a long and a short side or between the major and the minor axis. Wires 8, 8' have such dimensions that the assembling/disassembling play within the groove 11 is wider than the one with the slit 12. Furthermore, FIG. 3b shows that the play in a perpendicular direction to distances "d" and "D" may be reduced to allow a prismatic match to element 7. This allows a correcting action of the inclination defects caused by archwire 8's torsion. In particular this play has a dimension that is lower than 1.41 L ("L" is equal to the transverse section's side dimension of archwire 8' when the section is squared). Furthermore, the torsion action by archwire 8' is even more effective if a wall defining fixing surface 9 has a variable thickness, converging or diverging depending on the defect to correct. Fixing surface 9 may define a sump P possibly enclosed in an frame C. The frame C passes along at least one of perimetral edges of surface 9. In this way the adhesive is kept in the sump P in order to simplify the fixing operation of element 7 to tooth 4. The frame C increase the extension of surface 9. According to the details of the embodiment shown in FIGS. 3a-3c, the variable thickness of surface 9's wall is located on frame C on each edge C's short side to correct inclination defects. However, it is possible that the wall's variable thickness is located only on a single frame C's short side or placed on one or each long sides of frame C depending on the defect to correct.

According to a preferred embodiment of the present invention, element 7 comprises at least a wall 19 defining one of the edges 13, 14. It also keeps archwire 8 in groove 11. At least one of edges 13, 14 has a shew sector with respect to axis A, so that archwire 8 locally flexes when assembled/disassembled. Thus a snap fit assembling/disassembling mechanism is created between archwire 8 and elements 7, where the wire is flexed while element 7 stays rigid and does not undergo shape changes.

The body 10 is preferably a single body comprising wall 19 and defining surface 9, groove 11, slit 12, sides 17, 18.

According to a preferred embodiment of the present invention, element 7 is manufactured through a plastic deformation of a blank generated by cutting a plate. The materials that are more suitable for this process are the metallic ones, especially inox steel and titanium alloys.

The plastic deformation, is obtained through moulds and internal movable cores, for example templates or taps, in order to calibrate body 9's local thickness, groove 11's and slit 12's dimensions.

It is possible to obtain various shapes through the combination of different Ponds between convergent walls defining angles between 0°-120° or preferably 0°-9°. Thus interstices I between element 7 and relative tooth 3 are wide and easy to beep clean, as shown later.

In FIG. 4 different element 7's embodiments are depicted, in particular in 4a, d, g, i at least one of the lower or upper edges 13, 14 is skew and follows a curved path. The curvature of the path does not change its sign, as in 4a, d, i, or changes sign as in 4g. At least one of the lower or upper edges 13, 14 has a straight portion as in 4b, c, e, f, h. This portion is straight for the whole longitudinal extension of the lower or upper edge 13, 14 as in 4c, e, f. Otherwise the path is fragmented, like a dovetail joint as in 4b, h. Furthermore, the straight portion is inclined with respect to the axis A with the exception of embodiment in FIG. 4c. There, it is shown a slit 12' such that the archwire 8 locally flexes during assembly. In particular, this is obtained by spacing slit 12' from a medium plane of groove 11', perpendicular to the surface 9' having trace M. Furthermore, the archwire 8's constraint's efficacy is enhanced if the orthodontic elements according to FIG. 4c are alternatively assembled between a tooth and the following one, with respect to the figure by rotating around the perpendicular tooth's axis the orthodontic element by 180°. In this case slits 12' are not coplanar. Furthermore, this specific mounting can also be used for every element according to the present invention.

Figure 4A:
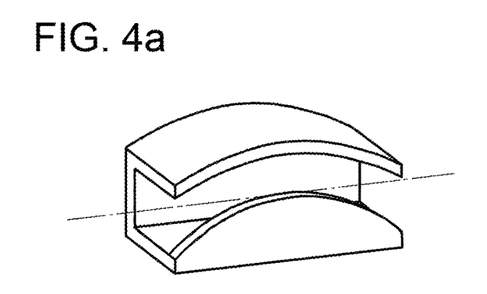
Figure 4B:
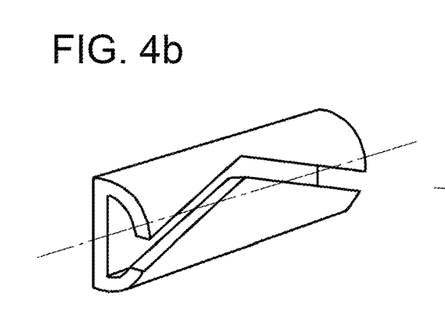
Figure 4C:
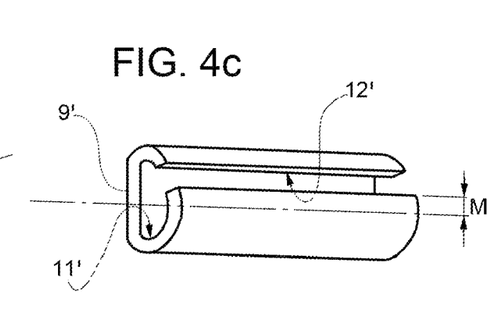
Figure 4D:
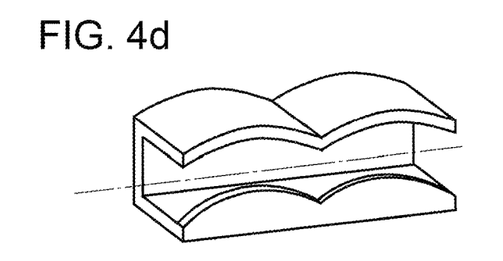
Figures 4E, 4F:
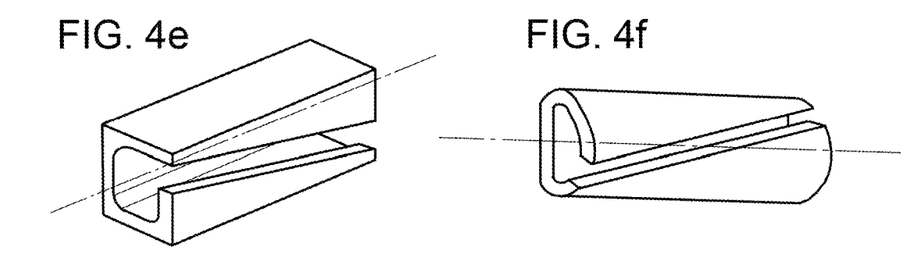
Figure 4G:
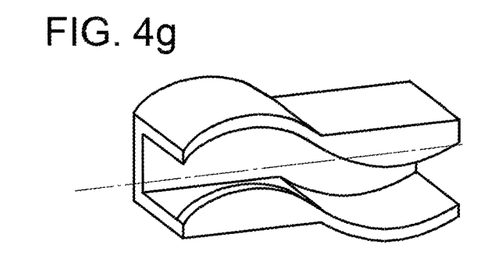
Figures 4H, 4I:
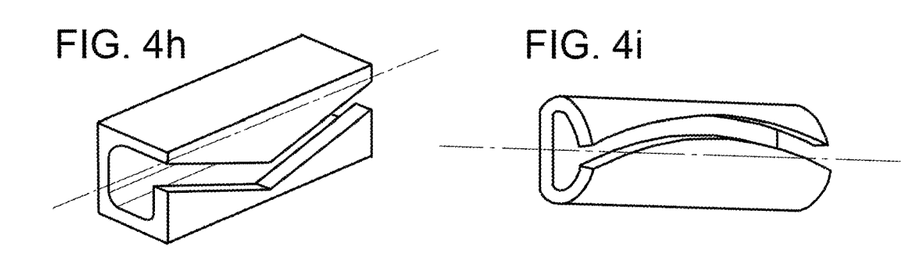

With respect to the bending corners for manufacturing element 7, FIG. 4a, d, g show at least two plane walls inclined at 90°. FIGS. 4e, h show three plane walls inclined at 90° with respect to each other. FIGS. 4b, i show a combination of plans and curved convergent walls with an angle lower than 90°. FIGS. 4c, f show a combination of plane and curved convergent walls with a 120° angle (depicted in 4f). It is preferable that ac least the angle between the walls converging towards tooth 3's crown is lower than 90° in order to define a draft to simplify the food's leftovers removal.

Figure 5:
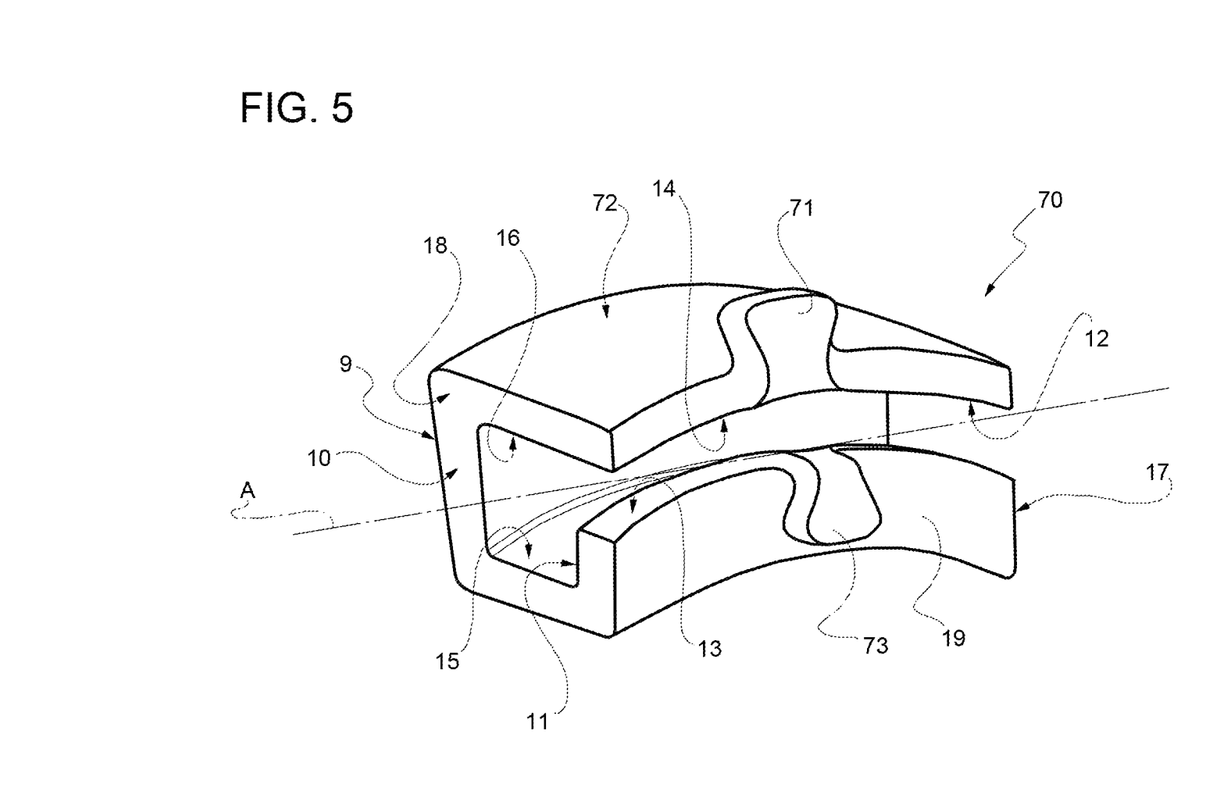

FIG. 5 shows an orthodontic element 70 equal to element 7 with the exception of what follows. The same numbers as in the previous paragraphs will be used to describe element 70's technical characteristics that are equal to those of element 1. In particular element 70 comprises at least one anchoring 71 in order to link an adjacent element 70 through bindings, elastics or others to correct diastema or for various necessities. Anchoring 71 presents a peculiar profile obtained through a cutting operation from one lower or upper edges 13, 14. As depicted in FIG. 5, it is bent to define a tooth or an elevation with respect to an outer surface 12 of element 70, the surface 72 being transverse to the fixing surface 9. Anchoring 71's sides are convergent to the enter surface 72 to better fix the binding. Element 70, in combination with anchoring 71, comprises a second anchoring 73 bent from the lower edge 13 in order to project from wall 19 and to allow another binding with a next element 70.

Figure 6:
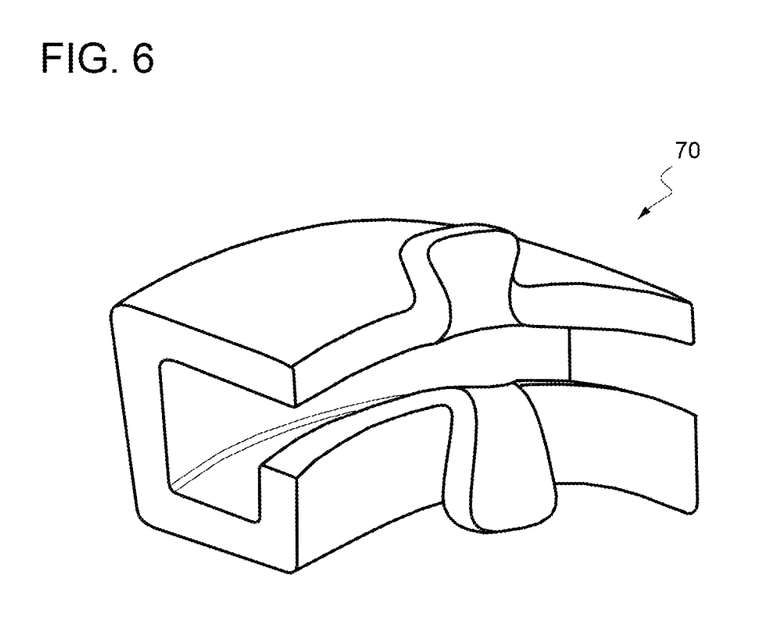

FIG. 6 shows an orthodontic element 70 with anchorings 71, 73 having different dimensions.

Figure 7:
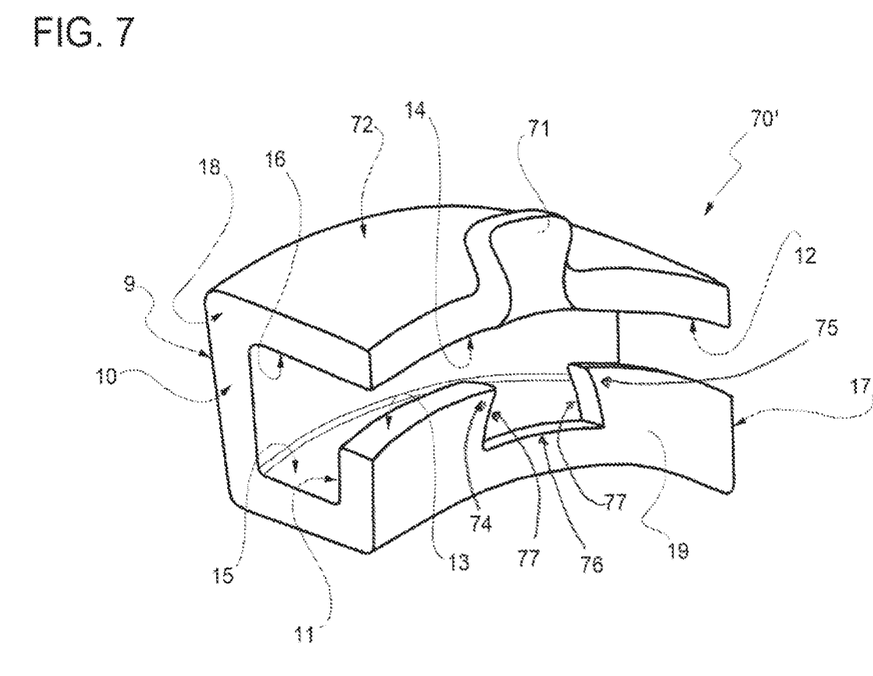

FIG. 7 shows an orthodontic element 70' equal to element 70 with the exception of what follows. Furthermore, element 70''s technical features that are equal to those of element 70 will be indicated with the same numbers of the previous paragraphs. In particular, element 70' comprises anchoring 74, 75 in addition to anchoring 71. In particular, the anchorings 74, 75 are defined by a through gap entering into groove 11 and, in the embodiment depicted in FIG. 7, they are defined by the lower edge 13 and by she sides 17, 18. The through gap has a bottom 76 spaced from lower edge 13 and sides 77 converging towards lower edge 13 to fix the binding with a better stability. Preferably, the though gap is open towards lower edge 13.

Figure 8:
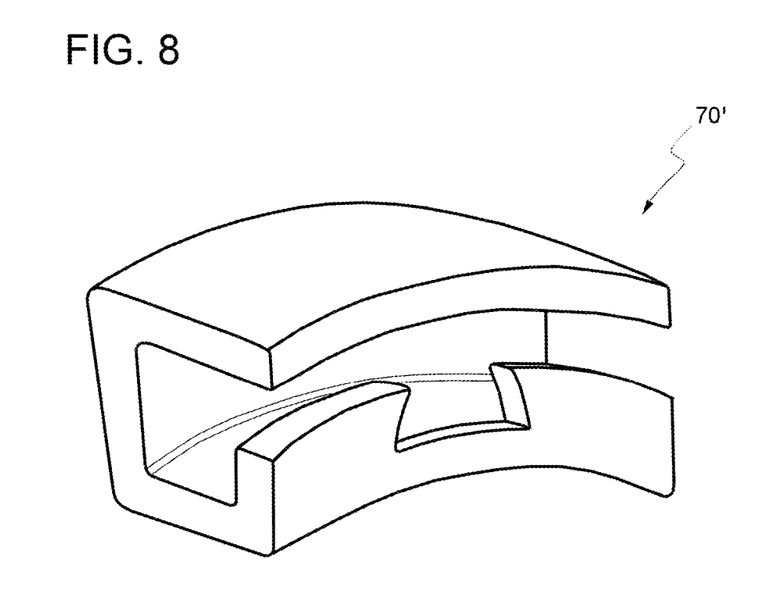
Figure 9:
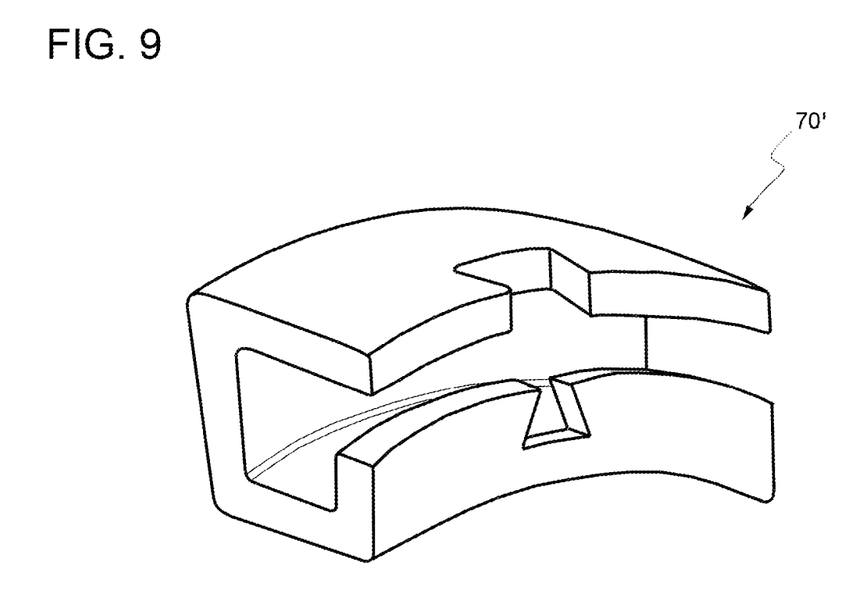
Figure 10:
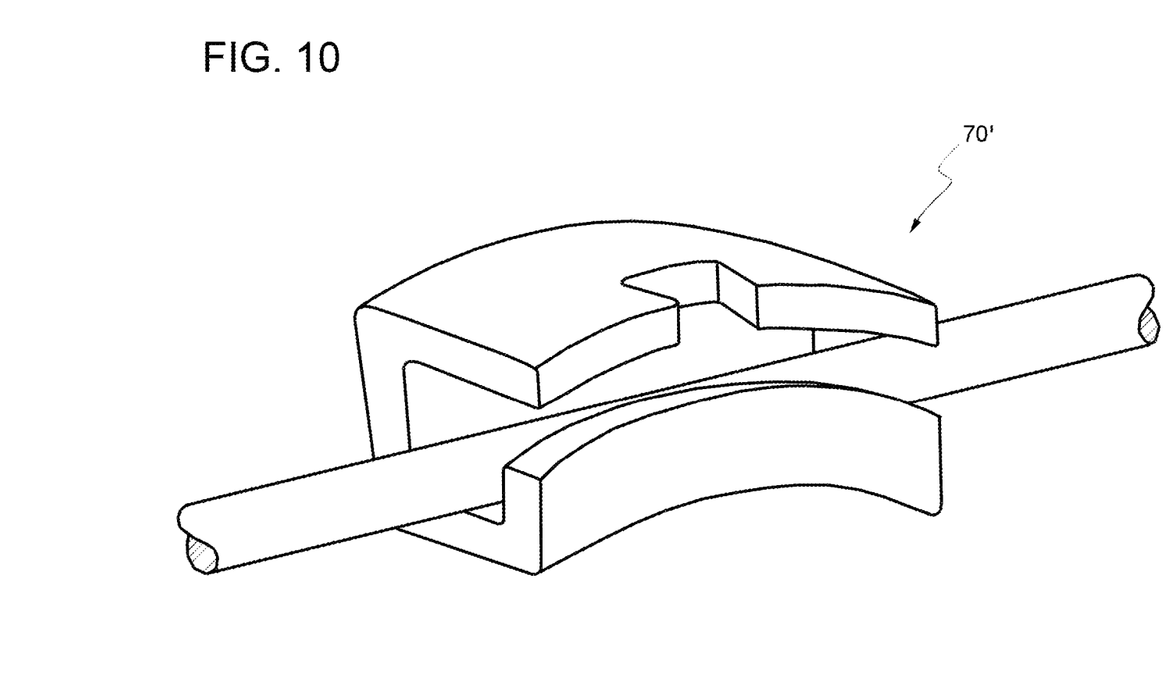

FIGS. 8, 9, 10 show elements 70' where, respectively, anchoring 71 is not provided; anchoring 71 is replaced by a second gap formed from the upper edge 14; anchoring 71 is replaced from the through gap according to FIG. 9, the gap depicted in FIG. 7 being absent.

Figure 11:
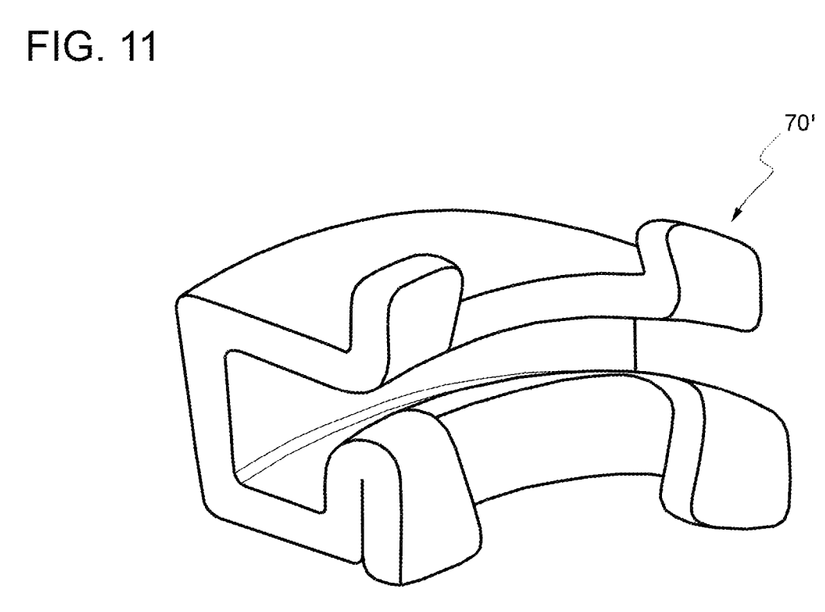

FIG. 11 shows an orthodontic element 70 where there are multiple anchorings 71, 73 along the relative lower or upper edges.

Anchorings 71, 73, 74, 75 may be manufactured as a single body with body 10.

Furthermore, in each embodiment depicted it is possible to recognize that elements 7, 70, 70' have a tubular shape having a 'C' shaped cross section to define groove 11 and slit 12. In order so obtain the desired effects, it is preferable that groove 11 and the orthodontic elements have a longitudinal width between 2.4 and 3.6 mm. Furthermore, according to the invention, it is possible to successfully carry out orthodontic repositioning treatments, thanks to elements with a depth between 1.4 and 2.3 mm, i.e. depth perpendicular to the tooth, and with a height between 1.7 e 2.6 mm.

Figure 12:
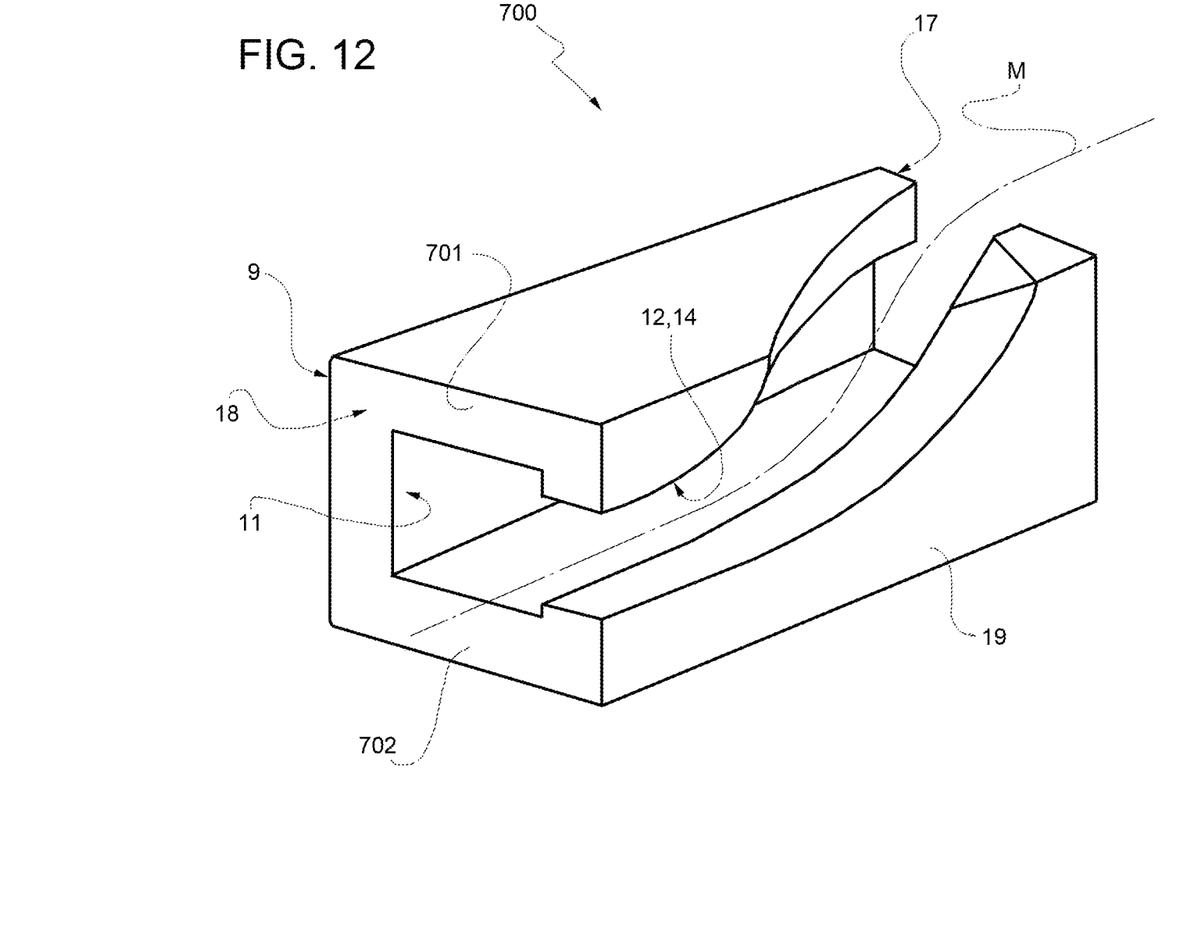
FIGS. 12-13 show respective perspective views of embodiments of the present invention.

FIG. 12 shows an orthodontic element 700's embodiment equal to element 7 with the exception of what follows. Furthermore element 700's technical features that are equal to those of element 7 will be indicated with the same numbers of the previous paragraphs.

In particular groove 11 can be reached through the slit 12 extending between the sides 17, 18 along the walls 19 and 701. The wall 701 extends between the fixing surface 9 and wall 19 in order to define the upper edge 14. In this way, the silt's 12 median line M fellows a three-dimensional path (not two-dimensional as in 4a, f). In particular the slit 12 has a curved portion on the wall 19 and a curved or straight portion, defined by wall 701, with a length lower than that of the first portion. According to a not depicted embodiment, the slit 12 also extends on a wall 702, alternatively to wall 701. The wall 702 is opposed to wall 701 with respect to the groove 11. Through the slit 12's three-dimensional path it is possible to assemble more suitably the archwire 8. In particular the archwire 8 flexes more comfortably thanks to the element 700 staying rigid and undeformed.

Figure 13:
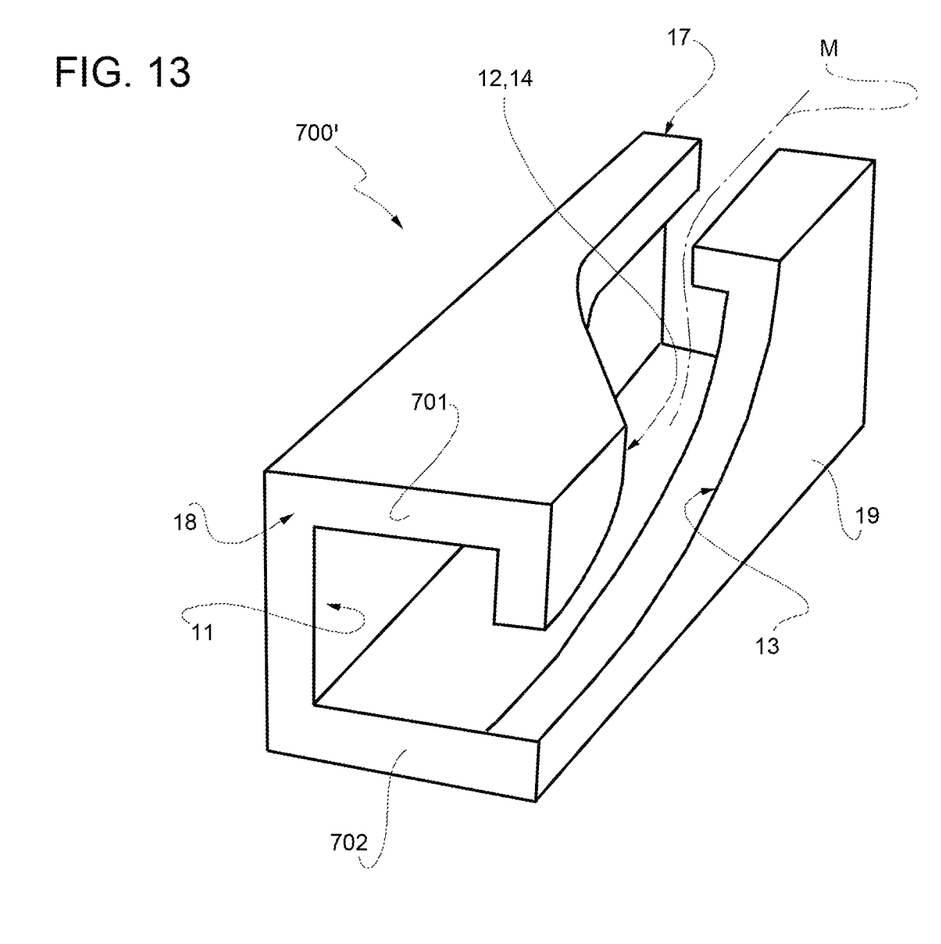

FIG. 13 shows an orthodontic element 700' equal to element 700 with the exception of what follows. Furthermore, element 700''s technical, features that are equal to those of element 7 will be indicated with the same numbers of the previous paragraphs.

In particular, the slit 12 with the depicted three-dimensional path has edges 13, 14 extending asymmetrically along walls 19 and 701. It is preferable that edges 13, 14 converge toward sides 17, 18 (in FIG. 13 toward side 18), in order to further simplify the archwire 8's deflection assembling process in the groove 11. More preferably, the groove 11 has a minimum transverse dimension proximal to one of the sides 17, 18 and a maximum transverse dimension between sides 17, 18 (FIG. 13), distal from each side. It can be obtained when edges 13, 14 has convergent portions toward tooth side 17 and side 18 (FIG. 13).

The advantages that can be achieved by means of the present invention are the following.

It is possible to provide elements with reduced volume, enhancing comfort and aesthetics. By not using movable parts and a snap fit connection through the slit 12, breakage risks are considerably reduced. Thanks to the manufacturing by bending, which imply straight or slightly curved bends and plane or round sectioned surfaces, it is possible to create smooth and regular surfaces. In this way cleaning operations are simplified.

The elements can be covered with the same pigments as teeth: it allows to apply normal products widely used in dental field. In this way it is possible to reduce the visual impact once the elements are applied in the mouth.

Anchorings 71, 73, 74, 75 suitably fit to intermaxillary and oral bindings and also to extraoral structures.

It is possible to apply modifications to the orthodontic elements described above without departing from the scope of protection as defined by the claims.

For example, archwire 8 has been previously described as curved and not bended: it is indeed conformed to a resting condition following curvature of the inferior and superior dental arch. However, it is possible to imagine elements 7 coin formed to bended archwires, having located bends that define 90° or 160° angles with minimum curvature radius and corrugations.

The slit 12 can be rotated toward the tooth's crown or root through a 90° rotation around the axis A as shown in FIG. 3. Each element can be rotated at 180° as the element in the FIG. 4c.

Anchorings 71, 73, 74, 75 can be on one or each side 17, 18 and manufactured by cutting or bending.

The archwire 8, 8' can be crafted with armonic inox steel, nickel-titanium, alloys or shape memory materials which can be activated by the temperature of the mouth.

Bending and cutting processes are preferably used when the orthodontic element is crafted with titanium. However, it is possible to use other materials that are fit to injection moulding or die casting, such as inox steel and polymeric matrix materials.

Furthermore, the fixing surface 9 is concave and shaped in order to fit to the different curvatures of incisors, canines, premolars and molars.

Furthermore, a single-body element 7 can be fixed through an adhesive, to a spacer fixed to a tooth.

With respect to FIGS. 12, 13, the first portion on the wall 19 can be straight and the portion on the wall 701, 702 can be curved in order to hole 12's three-dimensional path.

The invention claimed is:

1. Orthodontic kit comprising
an archwire (8); and
a plurality of elements (7) at least one of which comprises a body which comprises a wall having a fixing surface (9) for adhering to the wall of a tooth,
said body (10) having additional walls (17, 18) to that having the fixing surface (9) and defining a seating groove (11) passing through the body for removably seating the archwire (8) which, seated in the groove (11) with a play along its axis, protrudes with respect to the element (7) through at least one of the (17, 18), and a slit (12) passing between the two walls (17, 18) and towards the groove (11) for mounting the archwire in the groove (11) through an elastic deformation of the archwire (8) deflecting its own axis whilst the element (7) remains undeformed; the slit (12) having longitudinal edges (13, 14) having a minimum distance (d) less than the minimum dimension (D) of the groove (11) along the direction of measurement of the minimum distance (d) so that a mounting clearance of the archwire with the slit (12) is lower than that with the seating groove (11) to retain the archwire (8) in the body (10); wherein the slit (12) is inclined in one direction throughout its length with respect to the axis of the groove to snap the archwire (8) through the slit (12) in the groove (11) and the slit (11) extends through two of the additional walls of the body.

2. Kit according to claim 1, characterized in that the cross section of the archwire (8) is either squared or circular.

3. Kit according to claim 1, characterized in that the cross section of the archwire (8) is either rectangular or elliptical with a shape factor less than or equal 2.

4. A kit according to claim 1, characterized in that—the longitudinal edges (13, 14) of the slit (12) converge towards one or both of the walls (17, 18).

5. A kit according to claim 1, characterized in that the body (10) defines a substantially C-shaped cross section.

6. A kit according to claim 1, characterized in that the element (7) comprises a protrusion or indentation in the longitudinal edges of said slit to provide an anchor for tying together two adjacent elements.

7. A kit according to claim 4, characterized in that the fixing surface (9) defines a frame (C) having a variable thickness along a short wall, and defining a well (P) adapted to collect an adhesive material to fix the element to a tooth.

* * * * *